Sept. 22, 1931.   W. C. FERGUSON   1,823,974
JOINTING ELEMENT FOR PIPE AND OTHER TUBULAR MEMBERS
Filed Nov. 11, 1929
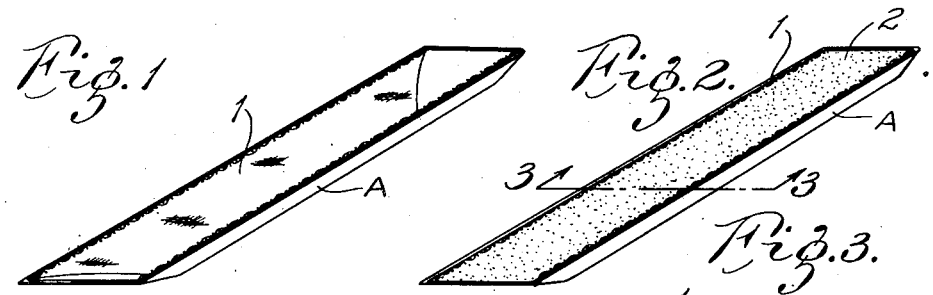
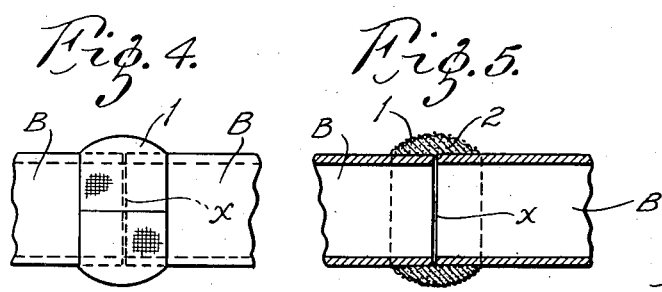
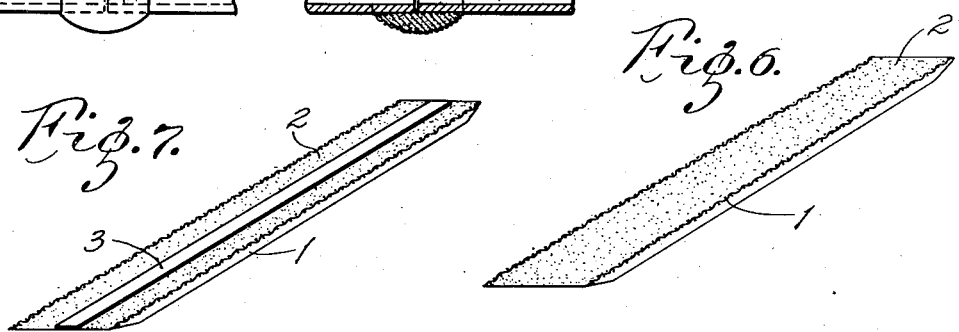
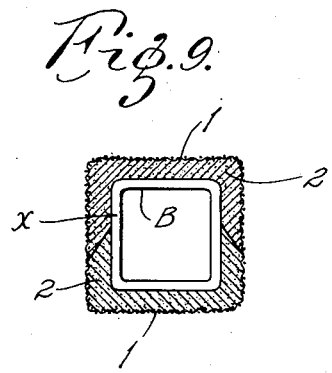
INVENTOR.
WM. C. FERGUSON
BY Bakewell & Church
ATTORNEYS.

Patented Sept. 22, 1931

1,823,974

UNITED STATES PATENT OFFICE

WILLIAM C. FERGUSON, OF ST. LOUIS, MISSOURI

JOINTING ELEMENT FOR PIPE AND OTHER TUBULAR MEMBERS

Application filed November 11, 1929. Serial No. 406,484.

This invention relates to the art of producing tight joints between sewer pipe and other tubular members that are used to form a conduit.

One object of my invention is to provide an inexpensive jointing element that can be applied quickly and easily to two pipe or similar members arranged in endwise relation, so as to produce a tight water-proof joint between the same.

Another object is to provide a simple method for producing a jointing element that is adapted to be applied externally to pipe or similar members arranged in endwise relation, so as to close the space or joint between said members.

And still another object is to provide a novel method for applying a plastic or semi-plastic material to the exterior of two pipe or similar members arranged in endwise relation, so as to produce an efficient closure for the joint between the ends of said members.

Figure 1 of the drawings is a perspective view of the trough or holder that is used in the operation of producing my improved jointing element, showing the flexible strip that forms part of the jointing element arranged in the trough preparatory to filling the trough with the plastic or semi-plastic material that forms the other part of the jointing element.

Figure 2 is a perspective view of the trough or holder after it has been filled with the plastic or semi-plastic material.

Figure 3 is a transverse sectional view, taken on the line 3—3 of Figure 2.

Figure 4 is a side elevational view, illustrating my improved jointing element arranged in operative position on two abutting sewer pipe or similar members.

Figure 5 is a longitudinal sectional view of the structure shown in Figure 4.

Figure 6 is a perspective view of my improved jointing element.

Figure 7 is a perspective view of a jointing element embodying my invention, provided with means for preventing the plastic or semi-plastic material from seeping through the top side of the joint between the pipe.

Figure 8 is a side elevational view, partly in section, illustrating a jointing element of the kind shown in Figure 7, arranged in operative position.

Figure 9 is a cross-sectional view, illustrating a jointing element embodying my invention, composed of a plurality of sections, arranged so as to form a band that surrounds the joint between two abutting pipe.

The jointing element that forms one feature of my present invention is composed of a strip of inexpensive flexible material, such as heavy paper, burlap, or other suitable fabric, and a mass of plastic or semi-plastic material spread on said strip in such a way that said material will be of substantially constant cross section throughout the major portion of the length of the jointing element, the said plastic or semi-plastic material being of such a nature that it will set, harden or solidify, partially or entirely, and thus act as a closure for the joint between the ends of the pipe or other members to which the jointing element is applied. The method of producing said jointing element consists simply of arranging a flexible strip of the kind referred to in a trough or other suitable holder, and then filling said trough with any plastic or semi-plastic material that is suitable for use as a closure for the space between the ends of two pipe or similar tubular members arranged in endwise relation, the top surface of said plastic or semi-plastic material being smoothed off in such a way as to produce a mass of material of substantially constant cross section, that is superimposed on or spread over the flexible strip that lines the trough. Plastic or semi-plastic materials suitable for use in carrying out my invention are mortars formed from Portland cement and asphaltic cement, but as previously stated, the particular type or kind of plastic or semi-plastic material that is employed is immaterial. In the operation of installing said jointing element the flexible strip with the mass of plastic or semi-plastic material thereon, is lifted out of the trough, and thereafter wrapped around the end portions of two pipe B in such a way that the plastic or semi-plastic material 2 contacts with the exterior of the pipe and covers the joint x between the ends of same, and the flexible strip 1 forms in effect a cover for the plastic material that confines or assists in confining said material in position on the pipe, as shown in Figure 5. My improved pipe jointing element may be of any preferred cross sectional shape and of such length that it extends unbrokenly around the pipe or other members with which it is used, or it may be made up of a plurality of sections that are adapted to be arranged so as to form a band that surrounds or encircles the adjacent end portions of the pipe and closes the joint between the same. If the jointing element is used with sewer pipe of the particular kind herein shown, namely, pipe whose ends are adapted to be butted together, said jointing element may be provided with means for preventing the plastic or semi-plastic material from seeping through the top side of the joint between the pipe while said material is setting or hardening. Said means preferably consists of a narrow strip of paper, fabric or other flexible material that is laid upon the top face of the mass of plastic material in the trough prior to removing the jointing element from the trough, or which is laid over the top side of the adjacent end portions of the pipe, preparatory to applying the jointing element to the pipe.

In the accompanying drawings which illustrate my idea applied to two sewer pipe of the type whose ends are adapted to be butted together, A designates the trough or other molding member that is used to facilitate the operation of spreading the plastic or semi-plastic material over the flexible strip so as to produce a pipe jointing element of the kind referred to. The trough A may be of any preferred cross-sectional shape, and will vary in length according to whether the jointing element is made up a plurality of sections, or consists of a single element that is adapted to be wrapped around the end portions of the pipe with the ends of said element butted together. To produce my improved jointing element a strip 1 of inexpensive flexible material, such as heavy paper or burlap, is arranged in the trough A, preferably in such a way as to line the bottom and sides of said trough, as shown in Figure 1. Thereafter, a mass 2 of plastic or semi-plastic material, suitable for use as a closure for the space between two adjacent sewer pipe or the like arranged in endwise relation, is dumped into the trough A on top of the strip 1 and spread over said strip by leveling off the top surface of the mass 2 with a trowel or the like that is drawn longitudinally of the trough in engagement with the top edge of same. The above described operation produces a pipe jointing element of the kind shown in Figure 6, that is inexpensive; that is substantially uniform in cross section; that can be applied quickly and easily to the exterior of two butted pipe simply by wrapping the element around the pipe, and which is not easily displaced or injured by the operation of back filling the earth around the jointing element. In the operation of removing the jointing element from the trough or other forming member A, the flexible strip 1 serves as a carrier for the plastic or semi-plastic material 2 and prevents said material from separating, and after the element has been applied to the pipe, said flexible strip confines the material 2 or holds it in approximate shape while said material is setting or hardening.

If the material 2 is of such a consistency that it is liable to seep through the top side of the joint between the pipe while said material 2 is setting or hardening, a narrow strip 3 of paper, fabric or other suitable flexible material can be laid upon the top face of the mass of material 2 in the trough prior to removing the jointing element from the trough, or such a strip 3 can be stretched over the joint at the top side of the pipe before applying the jointing element to the pipe. The strip 3 may either extend the entire length of the jointing element, or it may extend for only a portion of the length of said element, but if the jointing element is equipped with a strip 3 that extends throughout only a portion of the length of the element, care must be taken when applying the element to have the strip 3 positioned at the top side of the pipe over the joint between the ends of same.

The above described method of joining sewer pipe or the like whose ends are butted together is more rapid and less expensive to practice than the methods heretofore used for joining such pipe, and it produces watertight joints between the pipe that are of uniform strength throughout their entire areas, due to the fact that each joint of a conduit composed of a strip of pipe is encased in or surrounded by a band of substantially constant cross section formed from a mass of plastic or semi-plastic material that adheres to the adjacent end portions of the pipe and which, in turn, is encased in a strip that confines or holds said mass in approximate position while it is setting or hardening. As previously stated, it is immaterial, so far as my invention is concerned, whether the jointing element is made up of a plurality of sections disposed so as to form a band that surrounds the pipe, or is made up of a single member or device of such length that it will extend completely around the pipe with which it is used. Therefore, in Figure 9 of the drawings I have illustrated a jointing element constructed in accordance with my invention, which is made up of two sections or parts arranged preferably with their ends in overlapping relation, and each composed of a mass of plastic or semi-plastic material 2 spread upon a flexible strip 1 that serves as a carrier for the material 2 during the operation of applying said material to the adjacent end portions of two pipes arranged in endwise relationship.

Having thus described my invention, what I claim as new and desire to secure by Letters Patent is:

1. A jointing element for pipe and other tubular members arranged in endwise relation, consisting of a flexible strip having formed thereon a mass of plastic or semi-plastic material, said strip being adapted to be applied externally to the adjacent end portions of two pipe in such a way that said mass extends over the joint between the pipe and adheres to the exterior of the pipe, and means for preventing said plastic or semi-plastic material from seeping through the joint at the top side of the pipe.

2. A jointing element for pipe and other tubular members arranged in endwise relation, consisting of a member of strip-like form composed of a molded mass of plastic or semi-plastic material that is of substantially constant cross section, a member combined with said mass in such a way that when the element is applied externally to the adjacent end portions of the pipe said member will prevent said mass from seeping downwardly into the joint between the pipe, and a flexible strip combined with said mass in such a way that it serves as a casing for same after the element has been applied to the pipe.

3. A method of producing a jointing element for pipe and other tubular members, which consists in arranging a flexible strip in a substantially trough-shaped holder so as to line the bottom and sides of same, and then introducing a plastic or semi-plastic material into said holder on top of said strip and spreading it over the same to form a body that is adapted to be applied externally to the adjacent end portions of the pipe to close the joint between the same.

4. A method of producing a jointing element for pipe and other tubular members, which consists in arranging a flexible strip in a holder of the approximate cross-sectional shape desired for the finished jointing element, introducing plastic or semi-plastic material into said holder on top of said strip, and then smoothing off said material so as to form a body of substantially constant cross section.

5. The combination of two tubular members arranged in endwise relation, and a closure for the joint between said members, consisting of a jointing element of strip-like form, composed of a flexible strip that constitutes the outer portion of the jointing element, a mass of plastic or semi-plastic material carried by said strip and confined by said strip on the adjacent end portions of said tubular members, and a device interposed between said tubular members and said plastic material to prevent said material from penetrating into the joint between said tubular members.

6. A method of jointing pipes and similar members arranged in endwise relation, which consists in molding a mass of plastic or semi-plastic material onto a flexible strip so as to form a body that will serve as a closure for the joint between the adjacent pipe, arranging a member on said body so as to prevent the material of same from seeping into said joint, and then using said flexible strip as a carrier to apply said molded mass to the adjacent end portions of the pipe and to confine said mass in position while it is setting or hardening.

7. A method of producing a jointing element for pipe and other tubular members, which consists in arranging a flexible strip in an elongated holder, then introducing a plastic or semi-plastic material into said holder on top of said strip and spreading it over the same to form a body that is adapted to be applied externally to the adjacent end portions of the pipe to close the joint between the same, and arranging a device on said body that will prevent the material of which said body is constructed from seeping through the joint at the top side of the pipe.

WILLIAM C. FERGUSON.